May 10, 1938.                H. JOACHIM                2,117,004
                            EXPOSURE METER
                          Filed Dec. 31, 1936
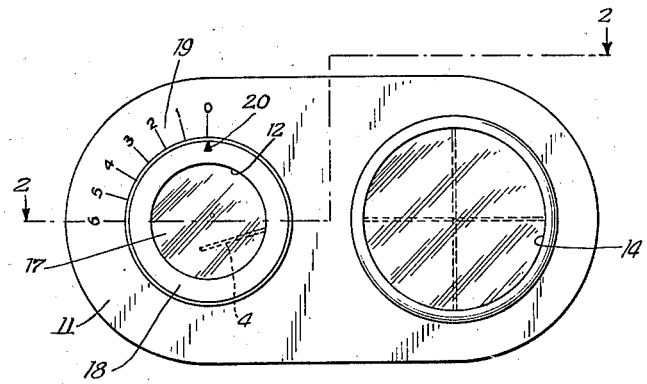
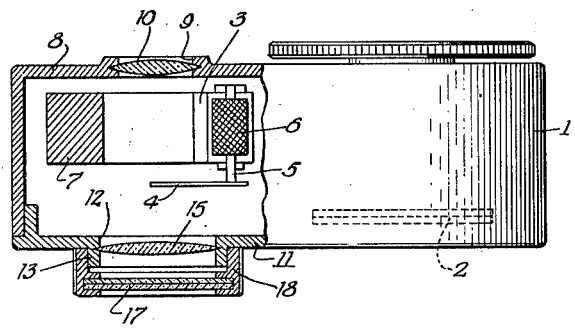
Inventor
Hermann Joachim
by B. Singer
   Attorney

Patented May 10, 1938

2,117,004

UNITED STATES PATENT OFFICE 2,117,004

EXPOSURE METER

Hermann Joachim, Dresden, Germany, assignor to Zeiss Ikon Aktiengesellschaft, Dresden, Germany Application December 31, 1936, Serial No. 118,661
In Germany November 26, 1935

1 Claim. (Cl. 88—23)

The invention relates to improvements of exposure meters for photographic purposes, and particularly pertains to the arrangement of polarizing filters (analyzer) on exposure meters.

It is an object of the invention to provide an exposure meter with an adjustable polarizing filter, comprising for instance, foils of dichroic crystal material placed between transparent plates which are cemented together. The attachment of a polarizing filter on an exposure meter serves the purpose of determining simultaneously with the exposure time the correct position of the polarizing filter, at which disturbing light reflections, when photographing bright objects, are eliminated. The invention, particularly is adapted for such exposure meters in which an indication of the exposure time appears in the observation opening of the exposure meter. After the polarizer on the exposure meter has been adjusted, the polarizer on the lens of the photographic camera has to be adjusted to the same position as the polarizer on the exposure meter.

Another object of the invention is to provide an exposure meter with a detachable polarizing filter, which is adapted to be transferred to the photographic lens or to the finder lens of a camera.

It is also an object of the invention to provide the polarizing filter with a light filter, which may be permanently or detachably combined with the polarizing filter.

With these and other objects in view the invention includes the following novel features and details of construction and combination of parts, to be hereinafter described and illustrated in the accompanying drawing and pointed out in the appended claim.

In the drawing:

Fig. 1 is a front elevation view of the exposure meter, and

Fig. 2 a top plan view of the same partly in section on the line II—II of Fig. 1.

The drawing illustrates by way of example a photoelectric exposure meter comprising an oblong casing 1 which contains the photoelectric cell indicated at 2 and the measuring instrument 3. The pointer 4 of the measuring instrument 3 is attached to the shaft 5 having secured thereto a coil or armature 6 positioned between the poles of a permanent magnet 7. The rear wall 8 of the casing 1 is provided with an observation opening 9, which may be provided with a lens 10. The front wall 11 is provided with an opening 14 for exposing the photoelectric cell 2 to light and with an opening 12 surrounded by an outwardly extending collar 13. A lens 15 is mounted in the opening 11, which is arranged in axial alinement with the observation opening 9 in the rear wall 8. It will be noted that the axis of the viewing passage extends clear through the recessed or hollow center portion of the permanent magnet 7 and that the free end of the pointer 4 appears in the observation area. By looking into the observation opening 9 and directing the opening 12 toward the object to be photographed, the photoelectric cell will be energized by light reflected from said object and the position of the pointer 4 will be an indication of the exposure time for which the camera has to be adjusted.

In accordance with the invention, a polarizing filter 17 is detachably and rotatably adjustably mounted in front of the opening 12. The filter 17, which may comprise two clear glass plates cemented together and having between the same a polarizing substance, as dichroic crystal material, is provided with a mounting ring 18. It will be noted from Fig. 2, that one end of the mounting ring 18 fits upon the collar 13 and is adapted to be rotatably adjusted with respect to the same. When the exposure meter faces the object to be photographed the polarizing filter 17, 18 is rotated until any disturbing light reflexes are eliminated, whereupon the adjusted position of the filter may be read off a scale 19 arranged on the outer face of the front wall 11 and cooperating with a mark 20 on the mounting ring 18.

The lens of the camera has to be provided with a similar polarizing filter which has to be adjusted to the same angular position the filter 17, 18 on the exposure meter has been adjusted. It is, however, also possible to remove the filter 17, 18 from the exposure meter and attach it in the same angular position to the photographic lens or a finder lens, so that a second polarizing filter may be dispensed with.

If desired, the polarizing filter 17 may be combined with a light filter which is detachably attached to the mounting ring 18.

What I claim is:

A meter for enabling the simultaneous determination of camera diaphragm stop opening, shutter speed, and polarizer adjustment for a given object-to-be-photographed, comprising a casing having a front wall and a rear wall and having two light-admitting openings in the front wall and one opening in the rear wall which is in alignment with one of the openings in the front wall and constitutes therewith an object-viewing passage, a photo-electric cell and a measuring instrument located within the casing, said cell being mounted behind the second light-admitting opening in the front wall, said measuring instrument having a movable pointer extending into said viewing passage and visible by looking through the viewing passage at the object to be photographed, said measuring instrument also including an adjustment disc at the rear of the instrument, a flange surrounding the first light opening in the front wall of the casing, a rotatably adjustable polarizing means mounted on said flange in alignment with the light opening in the front wall of the viewing passage, means on the instrument for indicating the adjustments thereof, said polarizing means being adjustable by the fingers of one hand of the operator holding the instrument while said adjustment disc may be simultaneously adjusted by the fingers of the other hand of the operator, thereby at one observation of the object to be photographed enabling the user of the instrument quickly to determine all three necessary adjustments, to wit, diaphragm stop opening, shutter speed and polarizer adjustment, for his camera to take the picture of the particular object viewed through the viewing passage of the instrument.

HERMANN JOACHIM.